July 19, 1932.  C. W. STUART  1,868,401
CUTTER FOR EGGS, VEGETABLES, AND THE LIKE
Filed Nov. 26, 1930   2 Sheets-Sheet 1
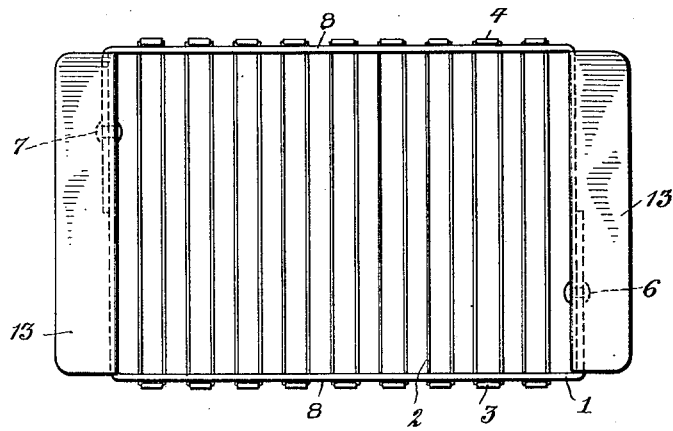
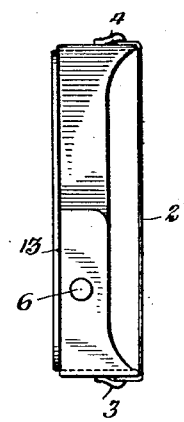
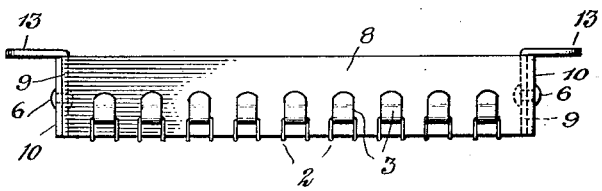
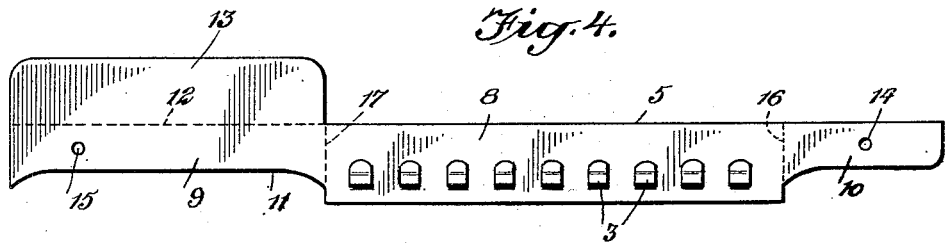
WITNESSES
INVENTOR
Clyde W. Stuart
BY
Munn & Co.
ATTORNEYS July 19, 1932.  C. W. STUART  1,868,401
CUTTER FOR EGGS, VEGETABLES, AND THE LIKE
Filed Nov. 26, 1930  2 Sheets-Sheet 2
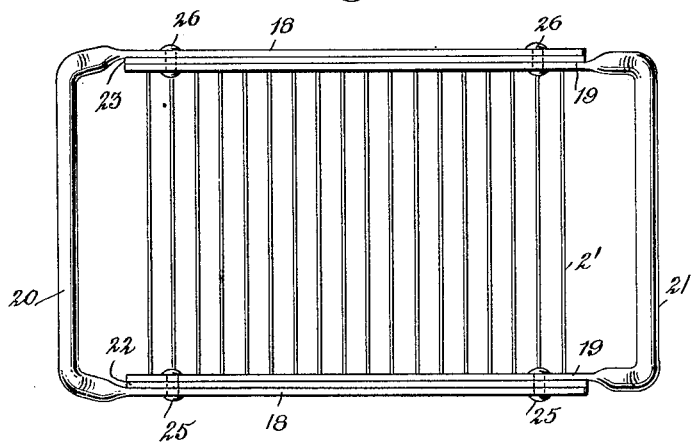
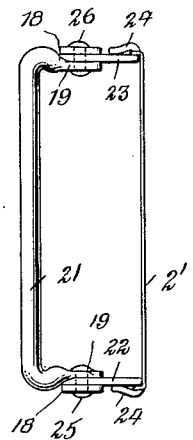
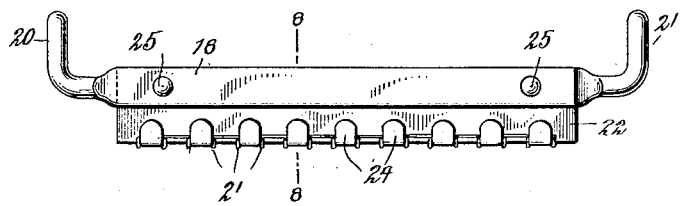
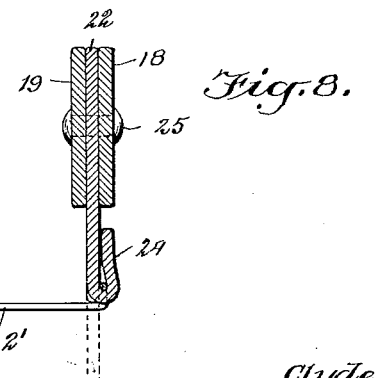
WITNESSES
INVENTOR
Clyde W. Stuart
BY
ATTORNEYS Patented July 19, 1932

1,868,401

UNITED STATES PATENT OFFICE

CLYDE W. STUART, OF NEW YORK, N. Y.

CUTTER FOR EGGS, VEGETABLES, AND THE LIKE

Application filed November 26, 1930. Serial No. 498,450.

This invention relates to a cutter, and particularly to an improved cutter adapted to cut eggs, vegetables, and the like, the object being to provide an improved, strong construction which will slice the desired object with comparatively little effort.

Another object of the invention is to provide a cutter formed with a beveled frame and cutting wires arranged in parallelism and anchored so that they will be held sufficiently rigid to cut raw or cooked articles into slices or into blocks according to the number of cuts given.

A further object, more specifically, is to provide a cutter formed of a pair of sheet metal blanks of identical construction, bent and riveted together to present a rectangular frame having hand-holds at each end and wire-receiving anchors at each side.

In the accompanying drawings—

Figure 1 is a top plan view of the cutter disclosing an embodiment of the invention;

Figure 2 is an end view of the cutter shown in Figure 1;

Figure 3 is a side view of the cutter shown in Figure 1;

Figure 4 is a side view of one of the blanks shown in Figure 1;

Figure 5 is a view similar to Figure 1 but showing a slightly modified structure;

Figure 6 is an end view of the device shown in Figure 5;

Figure 7 is a side view of the device shown in Figure 5;

Figure 8 is a sectional view through Figure 7 on the line 8—8, the same being on an enlarged scale.

Referring to the accompanying drawings by numerals, 1 indicates the frame, and 2 the cutting wires which are held in place by suitable anchors 3 and 4. These anchors are pressed out tongues around which the wires are looped. After the wires have been properly looped these tongues are pressed back towards their original position so as to pinch the wires and thereby prevent shifting thereof.

This will cause the wires to remain taut and as they are very small they will produce a backward and easy cutting action when the device is in use.

The frame 1 is made up of two parts, namely, two blanks 5, as shown in Figure 4. The two blanks are identical and when properly bent are rigidly secured together by suitable rivets 6 and 7. As shown in Figure 4 the blank 5 is formed with what may be termed a body 8 from which extends the end 9 and the end tab 10. End 9 is cut away at 11 so that the lower edge will be spaced above the lower edge of the body 8, whereby the wires 2 will always engage the article being cut first. This is clearly brought out in Figure 2. End 9 is bent along the line 12 for forming a hand-hold 12. Apertures 14 and 15 accommodate rivets 16 and 17 when the blank is bent along the lines 16 and 17 and assembled as shown in Figure 1.

The hand-holds 13 are of ample size and are at the top of the device so that when the cutter is pressed down upon the egg, potato, vegetable or other article, the wires 2 will first engage the article being cut. Also, by reason of the ample size of these hand-holds they may be grasped by all the fingers and thumb and, consequently, ample power used to secure the desired cutting action. It is evident that eggs or other articles may be merely sliced by a single operation of the device or cut into squares or other shapes by first slicing the article and then turning the device and cutting the article at right angles or at some other angle.

In Figures 5 to 8, inclusive, a modified construction is shown wherein the same inventive idea is present but the detailed form is somewhat different. In this form of the invention identical side plates 18 and 19 are provided, side plates 18 merging into the handle 20, while side plates 19 merge into a handle 21. The respective plates 18 and 19 are spaced slightly apart, and in said space are provided wire-receiving blanks 22 and 23. These blanks are identical in structure and are each provided with a series of tongues 24 extending from the respective lower edges. As shown in Fig. 8 these tongues are bent upward and pinched against the body or plates so as to grip the respective wires 2'.

As shown particularly in Figs. 5 and 7 the various groups of plates are secured together by the respective rivets 25 and 26. In the formation of the handles 20 and 21 they extend a short distance axially from the respective side plates and then upwardly, as shown in Fig. 7, whereby the hands of the operators are placed an appreciable distance above the wires 2'. It will thus be seen that in all forms of the invention the operating handles are arranged at each end and are spaced upwardly away from the cutting wires.

It will also be observed that in all forms of the invention the wires are firmly clamped by tabs or tongues pressed from metallic plates so as not only to act as anchors but as clamping or pinching members for rigidly holding the wires against slipping, thus causing the wires to always remain taut and thereby present a good cutting member.

What I claim is—

A cutter for eggs, vegetables and the like comprising a frame formed with a pair of upstanding handles, each handle having a pair of side plates extending therefrom said plates extending in a plane at right angles to said handles and in parallelism with the side plates of one handle and overlapping the plates of the other handle, a wire receiving plate positioned between the respective pairs of side plates and riveted thereto, and a plurality of cutting wires secured to said wire receiving plates.

CLYDE W. STUART.